(No Model.) 7 Sheets—Sheet 1.

G. & A. RAYMOND.
GRINDING MILL.

No. 387,257. Patented Aug. 7, 1888.

Witnesses,
L. F. Mann
Frederick F. Goodwin

Inventor
George Raymond
Albert Raymond
By Offield and Towle, Atty's (No Model.) 7 Sheets—Sheet 2.

G. & A. RAYMOND.
GRINDING MILL.

No. 387,257. Patented Aug. 7, 1888.

Witnesses,
L. Mann,
Frederick F. Goodwin

Inventor,
George Raymond
Albert Raymond
By Offield and Towle, Att'ys.

(No Model.) 7 Sheets—Sheet 3.

G. & A. RAYMOND.
GRINDING MILL.

No. 387,257. Patented Aug. 7, 1888.

Witnesses,
L. F. Mann
Frederick F. Goodwin

Inventor,
George Raymond
Albert Raymond
By Offield and Towle
Atty's.

(No Model.) 7 Sheets—Sheet 4.

G. & A. RAYMOND.
GRINDING MILL.

No. 387,257. Patented Aug. 7, 1888.

Witnesses,
L. S. Mann,
Frederick F. Goodwin.

Inventor,
George Raymond
Albert Raymond
By Offield and Towle, Attys.

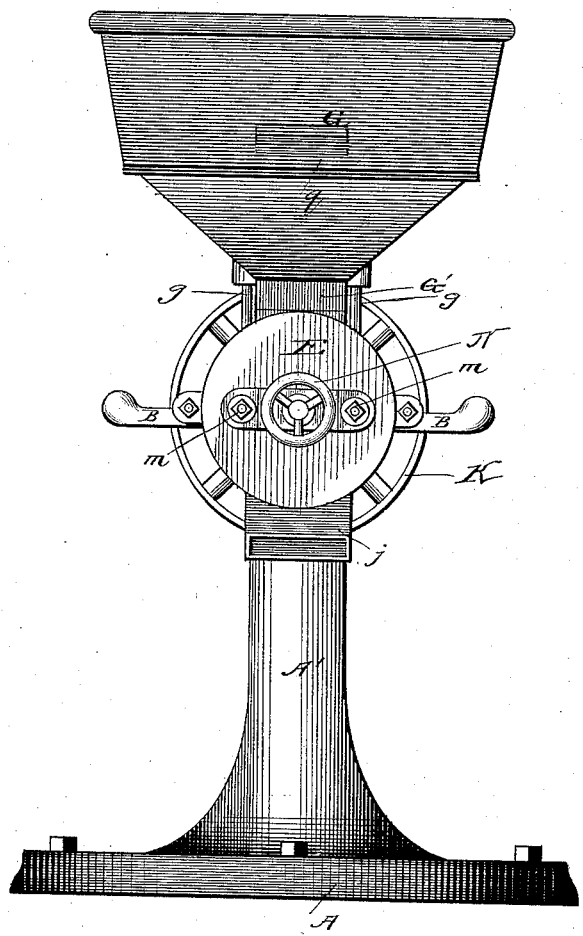

(No Model.) 7 Sheets—Sheet 6.
G. & A. RAYMOND.
GRINDING MILL.
No. 387,257. Patented Aug. 7, 1888.
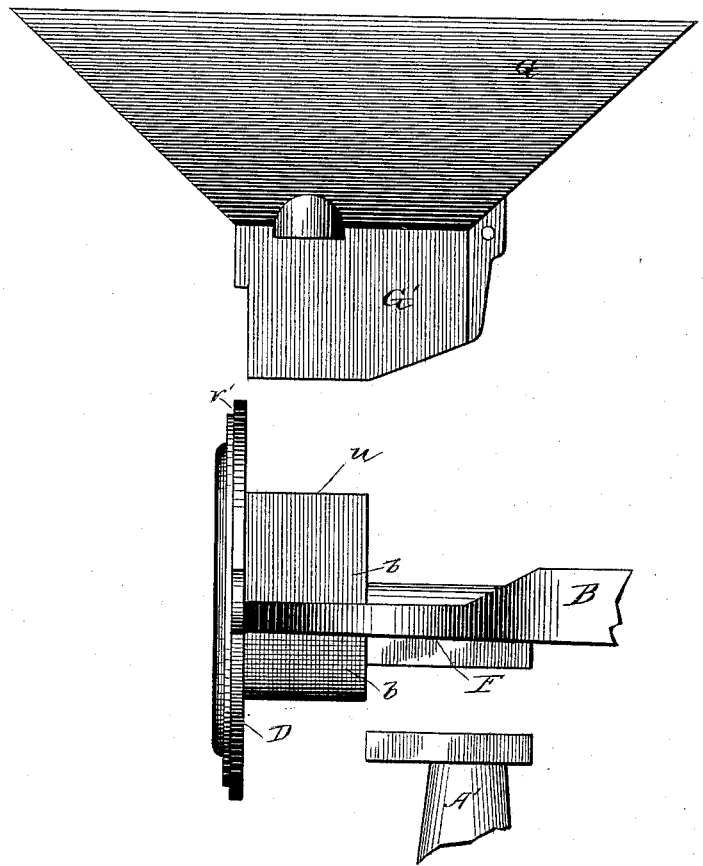

(No Model.) 7 Sheets—Sheet 7.

G. & A. RAYMOND.
GRINDING MILL.

No. 387,257. Patented Aug. 7, 1888.

Witnesses,
D. F. Mann
Frederick F. Goodwin

Inventor,
George Raymond,
Albert Raymond,
By Offield and Towle, Atty's.

UNITED STATES PATENT OFFICE.

GEORGE RAYMOND AND ALBERT RAYMOND, OF CHICAGO, ILLINOIS, ASSIGNORS TO THE APPLETON MANUFACTURING COMPANY, OF APPLETON, WISCONSIN.

GRINDING-MILL.

SPECIFICATION forming part of Letters Patent No. 387,257, dated August 7, 1888.

Application filed June 4, 1887. Serial No. 240,285. (No model.)

*To all whom it may concern:*

Be it known that we, GEORGE RAYMOND and ALBERT RAYMOND, citizens of the United States, residing at the city of Chicago, in the county of Cook and State of Illinois, have invented a certain new and useful Improvement in Grinding-Mills, which we desire to protect by Letters Patent of the United States, of which the following is a specification.

Our invention has principally for its object such construction of double grinding-mills as will permit either one or the other of the grinding devices to be thrown at pleasure out of position and the grinding process thereby limited to the operation of one set of burrs or grinding-disks, which may often be desirable when the full capacity of the mill is not required.

It also relates to a provision for automatically preventing contact of the grinding-disks when the supply of material is accidentally stopped, and further relates to contruction and details hereinafter described.

Figure 1:
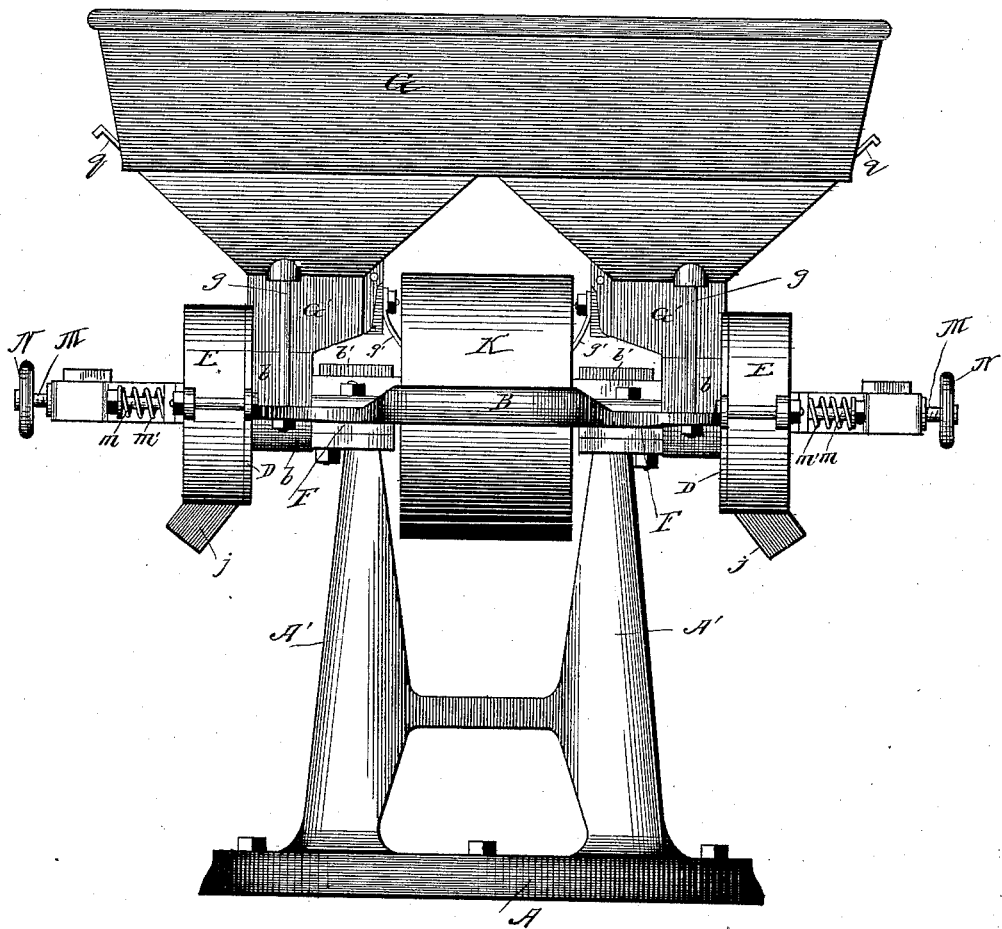
Figure 2:
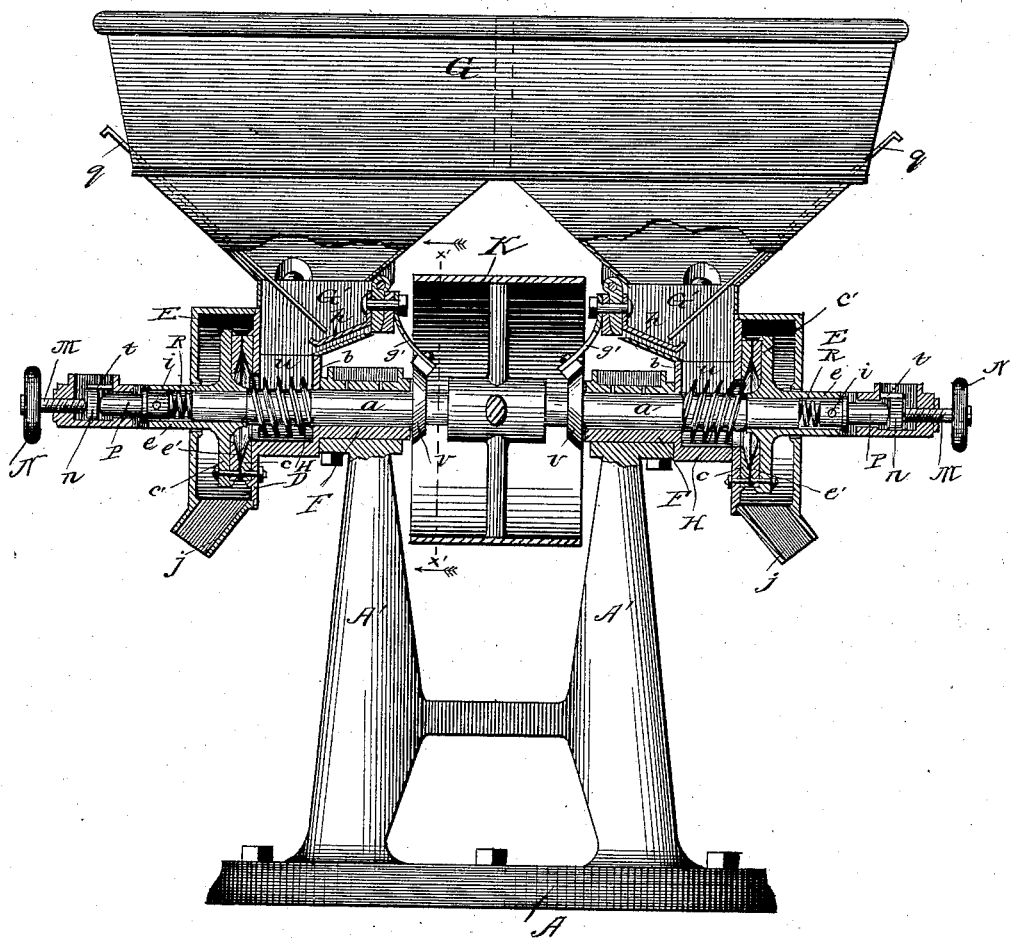
Figure 3:
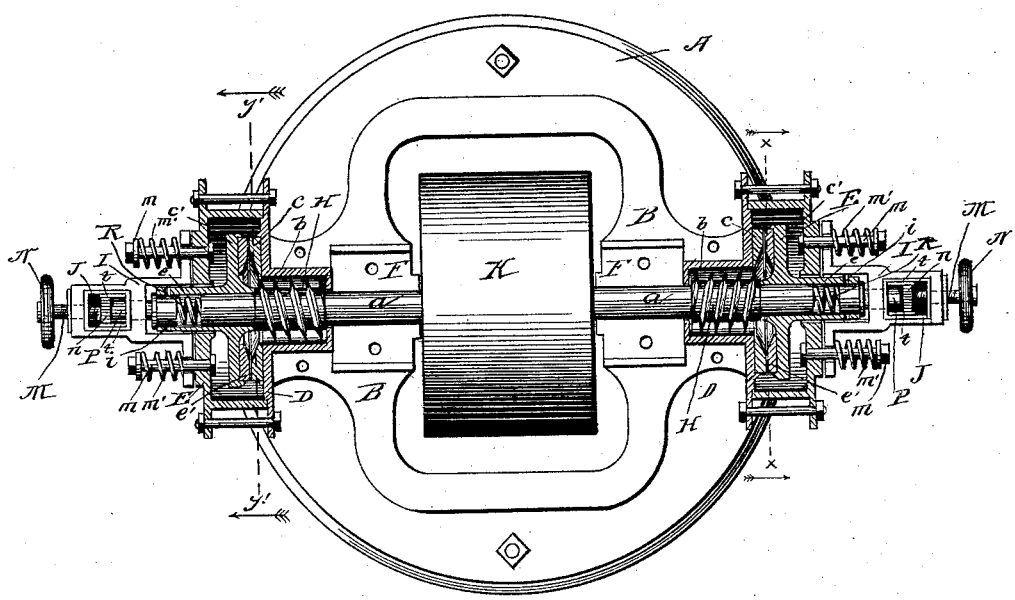
Figure 5:
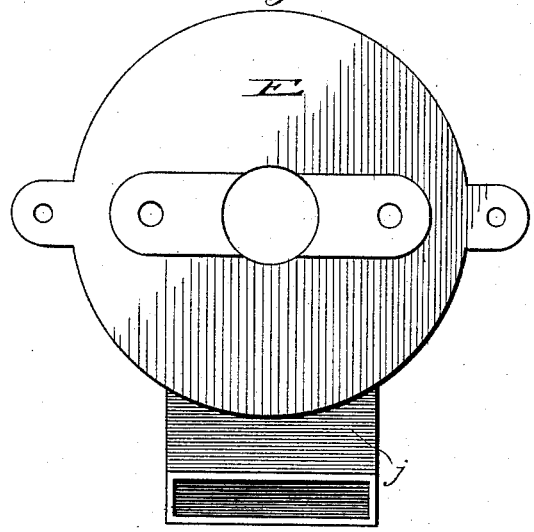
Figure 4:
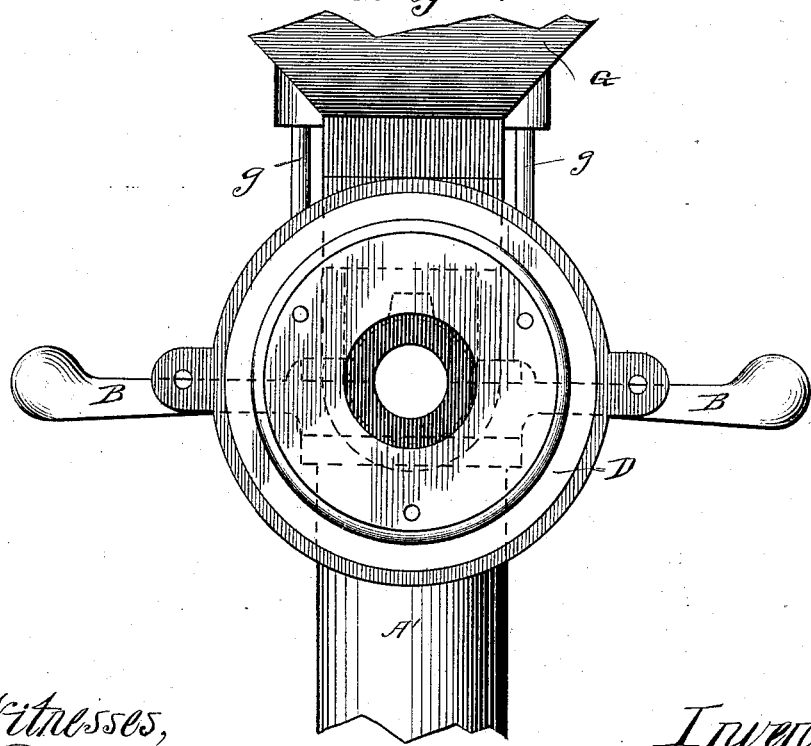
Figure 9:
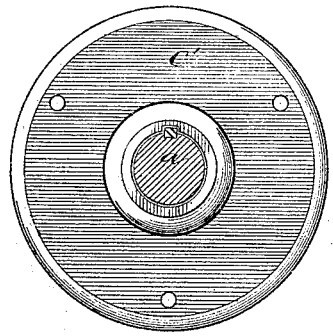
Figure 8:
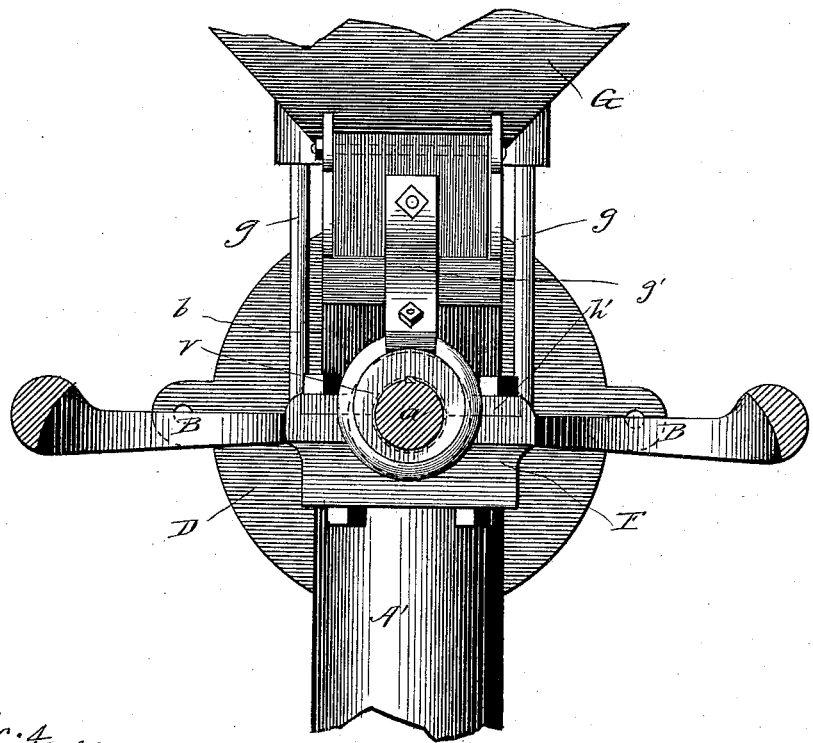

In the accompanying drawings, forming part of this specification, Figure 1 is a side elevation which, in the disk-adjusting portions, is partly in section. Fig. 2 is also a side elevation, partly in section. Fig. 3 is a plan view showing the grinding mechanisms in horizontal section. Fig. 4 is a detail through line $x\,x$, Fig. 3, with the grinding-disk removed. Fig. 5 is a detail view of the hoop covering the grinding-disks. Fig. 6 is an end elevation. Fig. 7 is a detail showing a portion of the hopper and fragmentary portions of principal castings. Fig. 8 is a limited vertical section through line $x'\,x'$; and Fig. 9 is a detail through line $y'\,y'$, Fig. 3, with the grinding-disk removed.

The supporting structure is represented by the base A and the two uprights A', cast integral therewith in the present example. The upper ends of uprights A' are flanged for convenience in securing thereon, by means of bolts, a horizontal casting or structural portion, B. The latter, as a matter of economic and preferable structure, is cast in one piece as a support for the double-grinding mechanism. A central or two-part portion gives space therein for the introduction of the driving-pulley. At either end of the double portion contracted or single portions F are formed corresponding in distance to and adapted to rest, respectively, on uprights A'. At these portions F of the casting suitable grooves for journal-bearings are formed, that we preferably provide with Babbitt metal bushings.

The manner of securing the flanged formation of part B upon the flanged uprights A' is shown in detail in Fig. 8, and a cap, $h'$, is shown for closing the box or bushing.

One end of casting B, to provide for the double character of the mill, as well as the mechanism at each end, is a duplicate or counterpart of the other, and therefore a description of the one suffices for both. From the journal-bearing portion of casting B outwardly is a recessed portion, $b$, terminating in a vertically-facing plate, D, which latter has a central aperture. The upwardly and outwardly extending walls of the recessed portion $b$, in conjunction with plate D, form the chamber $u$, open at the top. Plates D form the terminus of the casting B. The outer face of plate D, as shown in Fig. 7, is dressed or turned off to receive the stationary grinding disk or burr $c$, which latter is bolted thereto, and is also turned off and shouldered, as shown at $v'$, Fig. 7, as a seat for the cap or hoop E, that incloses the grinding-disk, which hoop is secured to plate D by bolts or in any suitable and removable manner. A shaft, $a$, is supported upon the bearings F and extends at its ends, respectively, through plates D and the eyes of the stationary grinding-disks and carries the revolving plates $c'$, to which are bolted the revolving grinding-disks $e'$. To provide for movement of plates $c'$ longitudinally of the shaft, it is formed upon a sleeve, $e$, that passes loosely over the end of shaft $a$, projecting outwardly through a central aperture in hoop E. The shaft $a$ is provided with a spline or feather at that portion over which the sleeve passes, which, in conjunction with a longitudinal groove in said sleeve, permits a longitudinal movement of the latter, while its rotation with the shaft is insured.

Shown more fully in horizontal section, Fig.

3, is a recessed or bifurcated plate, I, bent at the inner ends to adapt them to the outer surface of the hoop E, to which it is secured exterior to sleeve e. The bolts m, that secure plate I to hoop E, are outwardly elongated and provided with spiral springs $m'$, the action of which latter is apparent. On the outer end of plate I, and integral therewith, is provided a box, J. The latter is provided with a circular central aperture in the direction of shaft a and on a line therewith that communicates with the interior of said box. Within the end of sleeve e is secured, by means of a pin or bolt, i, a cylindrical extension or stop, P, shouldered to abut the end of said sleeve and extending outwardly through the aperture of box J to the interior thereof. Between the end of stop P and the extremity of shaft a is interposed a spiral spring, R. The outer end of the box J is provided with a threaded aperture, into which is inserted an adjusting-screw, M, on which is a hand-wheel, N. On the interior of box J, and interposed between the end of stop P and the end of the adjusting-screw M, is a follower-plate, n. Provision is made to admit the latter to the interior of the box and retain it in proper position by means of shoulders or flange-formations t at the upper interior surface of the box-walls, the length of which is sufficiently less than the interior of the box to permit the introduction of said follower with space beneath for an adjusting movement thereof. Stop P, as apparent, necessarily rotates with the shaft a, and its frictional end bearing essential to the operation of the parts is sustained by the follower, and the two are therefore hardened to reduce the wear to the minimum. On shaft a, within the chamber u, is introduced a short spiral conveyer, H. The blade or worm of the latter is formed upon a sleeve, preferably cast integral therewith, that slides over the shaft, where it is secured by means of a spline. The blades may, however, be cast upon the shaft.

The two-part or partitioned hopper G is provided with discharge-terminals or shoe-inclosures G', adapted, respectively, to rest upon the walls of chamber u and the upper edges of plates D, where they are secured by bolts g. Communication is thus formed between the interior of the hopper through chamber u, the central aperture of plate D, and the eye of the stationary grinding-disk, with the space between the latter and its revolving consort for feeding the material. The shoe h is supported in the usual manner to permit its necessary vibration for the feeding operation, and receives its vibratory movement from an eccentric-disk, v, on shaft a. The periphery of said disk is beveled, and a connection is made with the shoe by means of fingers or bars g', connected with said shoe, against which the beveled surface of eccentric v rubs, as apparent in Fig. 2. The eccentrics v are located on shaft a just within its bearings on casting B, and thereby serve as collars to secure said shaft against longitudinal displacement.

It is apparent from the drawings and foregoing description of the mechanism for adjusting the disk that, through the connection of stop P and follower n, longitudinal movement of screw M will impart a corresponding movement to sleeve e, and consequently to plate $c'$ and grinding-disk $e'$, and thus the necessary adjustment is obtained for controlling the quality of the grinding. The action of springs $m'$ of bolts m is in a direction to force plate I against hoop E, and consequently hold the revolving grinding-disk in position with relation to the stationary disk, yet when any substance foreign to the material being ground, and of such size and hardness as to prevent ordinary passage between the disks, finds its way within the latter, springs $m'$ yield, permitting an outward movement of plate I and a corresponding movement of the grinding-disk $e'$, and thus, without damage to the mechanism, allowing the object to pass through. The force of spring R is outward, and tends by its action against stop P to cause the sleeve and revolving disk to slide on the shaft in the same direction. It is thus obvious that by a retraction of screw M a separation of the grinding-disks sufficient to prevent the possibility of contact results, and such position by the action of spring R is insured during a time desirable. By this provision either set of grinding-disks may be employed, while the rotating portion of the other, though continuing to revolve, is in a position to insure harmless inoperative movement; or if the mill should run empty no harm would result, as in that event the spring R would insure a steadiness of the revolving disk that would prevent contact with its accompanying disk.

The simplicity and economy of the mill are apparent. The dual character of casting B, with its terminal plates D provided with central apertures and its journal-seats F, forms a structural basis for the grinding mechanism of the most advantageous kind. Shaft a, having its bearing on said plate and its ends extending through the plates D at its extremities, where the grinding mechanisms are applied, and the axes of the rotating parts coinciding throughout, affords, in conjunction with the other parts, a construction of double mills highly advantageous. The general operation of the mill is too apparent to need but little, if any, description. Pulley K affords means for driving the machinery. The grain or material to be ground is shaken by shoe h into the chambers u proportionately to the capacity of the mill, which may be regulated by a slide, q. The conveyers H have right and left or reverse spiral flanges, whereby one direction of rotation feeds the grain from chambers u through plates D and the eyes of the stationary disk to undergo the grinding process, from whence it is discharged through spouts j.

We are aware that it is not new to provide springs for permitting the discharge of obstructing material, and we do not therefore broadly claim such mechanism, nor do we design to limit our claims to double mills for those features of invention which are equally applicable to a single mill.

Having thus described our invention, what we claim, and desire to protect by Letters Patent, is—

1. In a grinding-mill in which the rotatable disk is mounted on a horizontal shaft, the combination, with a disk so mounted and having for support thereon a sleeve or tubular formation of such length as to extend beyond the end of the shaft, and screw mechanism adapted to operate against the end of said sleeve for adjusting the disk, of a spiral spring so interposed between the end of the shaft and the extending end of said sleeve that when pressure of the adjusting mechanism is retracted said spring will operate to withdraw the rotatable disk from the stationary disk.

2. In a double mill, the combination, with a shaft, $a$, sleeves $e$ adjustable thereon, which latter support the rotatable grinding-disk, and mechanism exterior thereto for adjusting said disk, of springs R, bearing at one end, respectively, against the end of shaft $a$, and at the other end against the stop P, secured to the sleeve by pin $i$, whereby the sleeve is forced outwardly when the adjusting mechanism is retracted to withdraw the disks, substantially as set forth.

GEORGE RAYMOND.
ALBERT RAYMOND.

Witnesses:
JOSEPH RIDGE,
FREDERICK C. GOODWIN.